(12) United States Patent
Matsushima et al.

(10) Patent No.: US 7,586,741 B2
(45) Date of Patent: Sep. 8, 2009

(54) DISK ARRAY APPARATUS AND LIQUID COOLING APPARATUS THEREOF

(75) Inventors: Hitoshi Matsushima, Ryugasaki (JP); Hiroshi Fukuda, Odawara (JP); Shunsuke Yamana, Odawara (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 11/346,297

(22) Filed: Feb. 3, 2006

(65) Prior Publication Data
US 2006/0176665 A1 Aug. 10, 2006

(30) Foreign Application Priority Data
Feb. 4, 2005 (JP) ............... 2005-029069

(51) Int. Cl.
*H05K 7/20* (2006.01)
*G06F 1/20* (2006.01)
(52) U.S. Cl. ............... 361/679.47; 361/679.46; 361/679.53
(58) Field of Classification Search ........... 361/687, 361/679.46, 679.47, 679.53
See application file for complete search history.

(56) References Cited

U.S. PATENT DOCUMENTS

| | | | | |
|---|---|---|---|---|
| 3,202,208 A | * | 8/1965 | Geiringer | 165/219 |
| 5,414,591 A | * | 5/1995 | Kimura et al. | 361/695 |
| 5,946,191 A | * | 8/1999 | Oyamada | 361/700 |
| 6,144,553 A | * | 11/2000 | Hileman et al. | 361/687 |
| 6,349,031 B1 | * | 2/2002 | Lin et al. | 361/685 |
| 6,643,132 B2 | * | 11/2003 | Faneuf et al. | 361/700 |
| 6,819,563 B1 | * | 11/2004 | Chu et al. | 361/696 |
| 6,927,980 B2 | * | 8/2005 | Fukuda et al. | 361/700 |
| 7,286,345 B2 | * | 10/2007 | Casebolt | 361/687 |
| 2003/0062149 A1 | * | 4/2003 | Goodson et al. | 165/104.11 |
| 2004/0264133 A1 | * | 12/2004 | Fukuda et al. | 361/695 |
| 2005/0081534 A1 | * | 4/2005 | Suzuki et al. | 62/50.2 |
| 2005/0114876 A1 | * | 5/2005 | Atarashi et al. | 720/649 |
| 2005/0155755 A1 | * | 7/2005 | Matsuda et al. | 165/301 |
| 2006/0032625 A1 | * | 2/2006 | Angelis et al. | 165/247 |
| 2006/0113661 A1 | * | 6/2006 | Yamabuchi et al. | 257/706 |
| 2007/0053154 A1 | * | 3/2007 | Fukuda et al. | 361/687 |

FOREIGN PATENT DOCUMENTS

| | | |
|---|---|---|
| JP | 2000-187975 | 7/2000 |
| JP | 2002-373034 | 12/2002 |
| JP | 2003-347781 | 12/2003 |

* cited by examiner

*Primary Examiner*—Anatoly Vortman
(74) *Attorney, Agent, or Firm*—Antonelli, Terry, Stout & Kraus, LLP.

(57) ABSTRACT

A liquid cooling apparatus for use in a disk array apparatus which contains a plural number of units having a disk drive inside of a housing and disposed within a rack, including an air-blow fan, a pump for transmitting liquid coolant, a radiator for transmitting heat absorbed into the liquid coolant into outside air, and pipes for connection of the pump and radiator. The liquid cooling apparatus further includes a temperature sensor disposed at a position for detecting temperature of the liquid coolant, which temperature changes in response to electric power consumed within the plural number of disk drives, and a rotation speed of the pump is controlled in dependence upon a detection signal from the temperature sensor.

15 Claims, 6 Drawing Sheets

DISK ARRAY APPARATUS AND LIQUID COOLING APPARATUS THEREOF

BACKGROUND OF THE INVENTION

The present invention relates to cooling of a disk array apparatus, installing therein magnetic- or optic-type disk drives in plural pieces thereof, and further, it relates to a liquid cooling apparatus for cooling heat generation, effectively, within such the apparatus with using a liquid coolant therein.

In general, the disk array apparatus is constructed by installing a large number of magnetic- or optic-type disk drives within a housing, for the purpose of increasing reliability of data reservation therein. And, those disk array apparatuses are connected with, through a high-speed network circuit for exclusive use thereof, such as, of an optic-type, etc., for example, to be operated by means of management software; i.e., they are utilized in the form of those disk apparatuses; i.e., the so-called SAN (Storage Area Network), NAS (Network Attached Storage), or an independent RAID (Redundant Array of Inexpensive Disks).

Normally, the disk drive to be installed within such the disk array apparatus comprises a disk main body, which installs a magnetic disk, a magnetic head, an actuator, etc, within an inside thereof, a package substrate, which mounts connectors thereon for connecting with electronic parts for use of control, and a canister attached with a handle or the like thereon, so that the disk main body and the package substrate mentioned above can be assembled with, and also the disk apparatus can be detached from the housing easily when conducting maintenance operation thereon.

By the way, main sources of heat generation in the disk drives mentioned above are the so-called electronic parts for control, including the drive motor, the actuator, a LSI, etc. However, those parts are cooled down through the cooling wind supplied by means of the cooling fan, which is conventionally provided within the disk array housing. For this reason, if cooling capacity thereof is bad, the temperature of the disk drive goes up, or there are generated unevenness in the temperatures among those plural numbers of disk drives, and as a result thereof, there is possibility of erroneous operations for a long time period and deterioration of reliability of the disk array apparatus.

Further, in general, as is already known by the following Patent Document 1, for example, within the conventional disk array apparatus, there is provided a fan for each of the drives, with respect to the plural pieces of disk drives within that housing, and control is made upon the fan, depending on the temperature value detected by a temperature sensor, which is provided on an outer wall of the each disk drive; thereby achieving a measure for equalizing cooling of the respective drives inside of the housing.

Or, alternately, as is already known by the following Patent Document 2, within the conventional disk array apparatus, in particular, for overcoming the problem boxes are provided, each containing the disk drives in a large number thereof within the housing, flow resistance is made smaller within an air vent passage, which is far in distance from an air blow fan provided in an upper portion of the housing; i.e., the flow resistance is made small at a downstream side within the box, thereby achieving a measure for equalizing cooling between upper and lower boxes.

Further, the following Patent Document 3 proposes a liquid cooling system, for cooling high heat-generation elements within electronic equipments, effectively or preferably, and in particular; it proposes a pump controlling method for reducing electric power consumption therein.

Patent Document 1: Japanese Patent Laying-Open No. 2000-187975 (2000);

Patent Document 2: Japanese Patent Laying-Open No. 2003-347781 (2003); and

Patent Document 3: Japanese Patent Laying-Open No. 2002-373034 (2002).

However, with the conventional art in relation to the Patent Document 1 mentioned above, since there is necessity of providing a sensor on each surface of the disk drives (in more details, on the outer wall), therefore the wiring becomes complex, within the housing, and also there is necessity of providing, as well as, a means for detecting temperature, a controller means for achieving control thereon, accompanying with it, i.e., controllers for a group of fans. For this reason, further, the temperature control in the controllers for use of the group of fans also comes to be a problem, from a viewpoint for maintaining the reliability of the disk array apparatus.

Also, with the conventional art in relation to the Patent Document 2 mentioned above, there is no such necessity of provision of the controllers for the group of fans and the controls thereof, as was mentioned above; therefore it is possible to improve the reliability of an equipment, but on the contrary thereto, there is another problem of taking a long time for adjusting the flow passages for the cooling winds within the housing, in particular, when designing the apparatus.

Further, with the conventional art in relation to the Patent Document 3 mentioned above, with using a liquid coolant therein, it is possible to obtain effects of improving the cooling performance thereof, greatly, comparing to that of the conventional air cooling method, and further increasing the lifetime of the pump, as being a driving source thereof. However, with this conventional art, the control on the pump mentioned above is achieved by using an element, which is installed in advance, into an electronic circuit board of a personal computer, such as, a keyboard controller, for example; therefore, the keyboard controller itself must be a one having special specifications thereof, so as to deal with inputs from the temperature sensors and outputs to the pumps, respectively. Also, the liquid cooling system itself must have a special input terminal, so as to input a signal from the controller mentioned above.

For this reason, with the conventional art in relation to the Patent Document 3 mentioned above, the controller mentioned above brings about an increase of cost, the control thereof becomes complex, and further problems occur with the reliability of the controller itself. As was mentioned above, a very high degree of reliability is required for the disk array apparatus or a server, and for this reason, it is necessary to study additionally the reliability factor when considering cooling of the apparatus.

BRIEF SUMMARY OF THE INVENTION

Then, according to the present invention, in particular, an object thereof is to achieve high-capacity and high-speed for a disk array apparatus, installation of disk drives with high density, while enabling an improvement on cooling performances of the disk drives and other electronic apparatuses, which are installed within a housing of the disk array apparatus, thereby reducing an increase in temperature of the disk drive, as well as, reducing the unevenness in temperatures among the disk drives, so as to increase the reliability of the disk drive apparatus and/or the electronic apparatus, and further obtaining a long lifetime thereof.

According to the present invention, for accomplishing the object mentioned above, firstly there is provided a disk array apparatus, comprising: a plural number of units, each containing a disk drive into an inside of a housing; and a rack for containing the plural number of units inside thereof, wherein the unit comprises a controller for controlling each of the disk drives within the unit and an air-blow fan, as well as, a liquid cooling system having, a pump for transmitting a liquid coolant, a radiator for transmitting heat absorbed into the liquid coolant into an outside air, and pipes for connecting those, the liquid cooling system is connected with, at least the controller, thermally, and further a rotation speed of the pump is controlled depending on a detection signal from a temperature sensor, which provided in a part of the liquid cooling system, for detecting temperature of the liquid coolant, changing responding to electric power consumed within the plural number of disk drives.

Further, according to the present invention, within the disk array apparatus as described in the above, the pipes of the liquid cooling system within each of the units may be further provided within a power source portion of the unit, or the temperature sensor within each of the units be provided, preferably, in a part of the pipes, which build up the liquid cooling system. Further, a cooling jacket may be provided within each of the units, being thermally connected with the plural number of disk drives contained within the housing, to be connected with in a part of the pipes, thereby building up a part of the liquid cooling system.

Further, according to the present invention, within the disk array apparatus, as described in the above, a cooling jacket may be provided, further, within each of the units, for cooling the controller, to be connected with in a part of the pipes, thereby building up a part of the liquid cooling system, or the temperature sensor may be provided in vicinity of an inlet of the radiator within each of the units. Or alternately, the detection signal from the temperature sensor within each of the units may be directly inputted into a controller portion of the pump building up the liquid cooling system within each of the units, or a partition may be provided within an inside of each of the units, thereby separating the liquid cooling system in spaces thereof.

Also, according to the present invention, for accomplishing the object mentioned above, there is further provided a liquid cooling apparatus for use in a disk array apparatus, containing a plural number of units, each containing a disk drive inside of a housing, within a rack, comprising: an air-blow fan; a pump for transmitting a liquid coolant; a radiator for transmitting heats absorbed into the liquid coolant into an outside air; pipes for connection; and a temperature sensor for detecting temperature of the liquid coolant, wherein the temperature sensor is disposed at a position so as to detect the temperature of the liquid coolant, which changes in accordance with electric power consumed within the plural number of disk drives, and wherein a rotation speed of the pump is controlled depending upon a detection signal from the temperature sensor.

Further, according to the present invention, the liquid cooling apparatus as described in the above, further comprises a cooling jacket, which is thermally connected with the plural number of disk drives contained within the housing, wherein the cooling jacket is connected with in a part of the pipes.

As was mentioned in the above, according to the present invention, it is possible to obtain an improvement on the cooling performances of the disk drives, which are contained within the rack of the housing of the disk array apparatus in a large number thereof, and also to reduce an increase of temperature of the disk drives, as well as, an unevenness in temperature among the disk drives; thereby obtaining a long lifetime and also improvement of reliability of the disk drives, and with this, it is possible to achieve installation of the disk drives at high density, and achieving large capacity and high speed of the disk array apparatus, as well. Further, according to the present invention, it is also possible to cool the high-heat generation element, such as, the controller to be installed within the housing of the disk array, with certainty, and thereby enabling an improvement on the reliability of the disk drive apparatus as a whole.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENT(S)

Hereinafter, embodiments according to the present invention will be fully explained by referring to the attached drawings. However, hereinafter, explanation will be made on an example of electronic apparatuses, into which the present invention is applied, in particular, an example of applying the present invention into a disk array apparatus.

Figure 1:
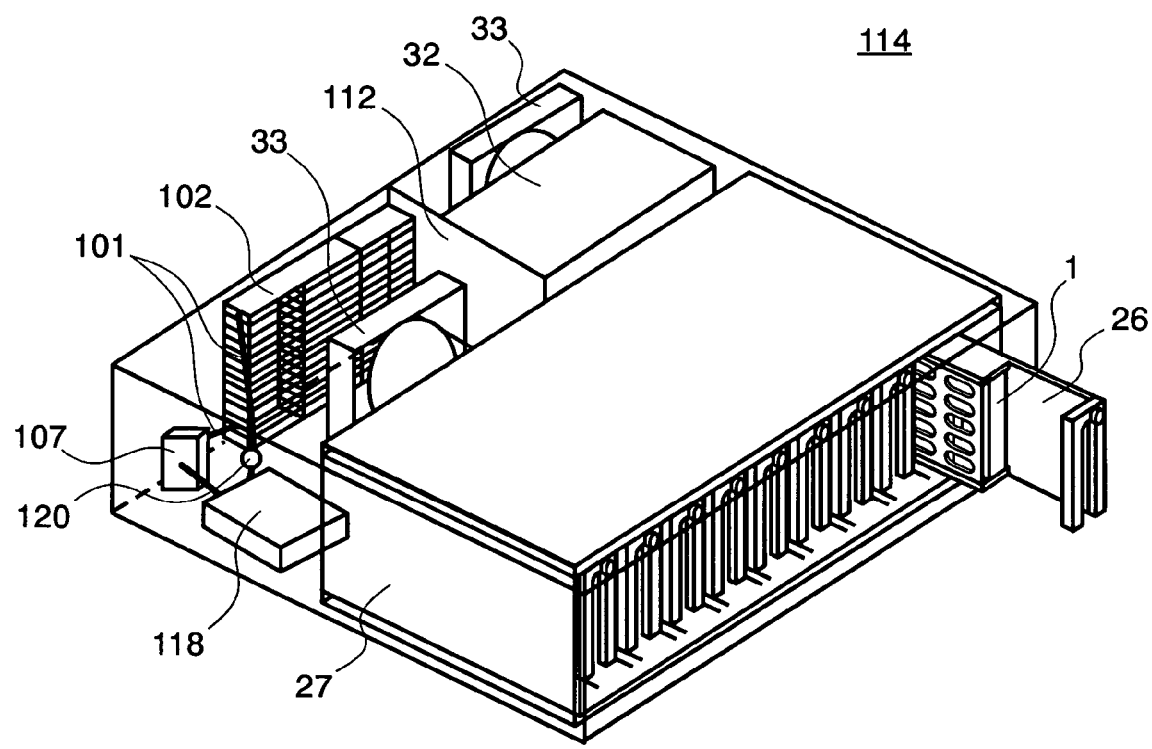
FIG. 1 is a perspective view of a unit housing, building up a disk array apparatus, according to an embodiment of the present invention.

Detailed explanation will be made about an embodiment of the present invention, by referring to FIGS. 1 to 6 attached herewith. First of all, FIG. 1 shows the entire structure of a unit housing 114 of a disk array apparatus, into which the present invention is applied, and this unit housing stores or contains therein a large number of disk main bodies 1, as well as, disk drives 26 (the detailed structures thereof is shown in FIG. 5), which include package boards 2 for control (not shown in the figure) and a canister 7 (not shown in the figure), with the disk drives 26 being aligned (in the present example, being aligned in the vertical direction in a large number) in a large number thereof within a box 27. Further, within the unit housing 114 is constructed, a liquid cooling system, with ventilation fans 33, and also a pump 107, a radiator 102, a jacket 118 and pipes 101, etc., for circulating a cooling liquid therein.

Figure 2A:
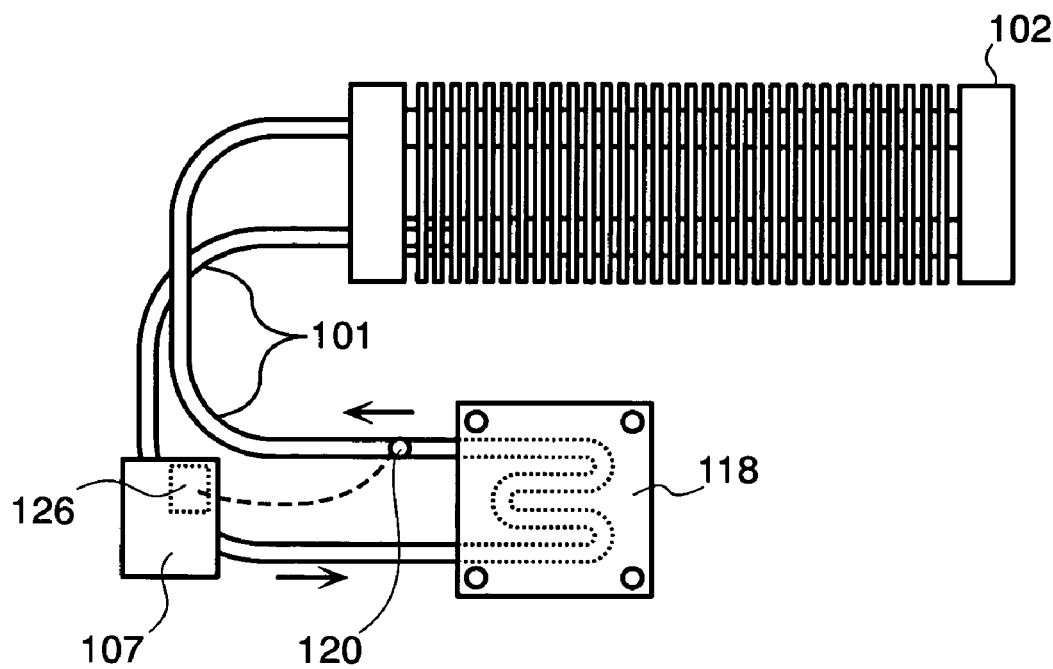
FIG. 2 is a view for showing an example of the structures of a liquid cooling system, according to the present invention, to be provided within the unit housing mentioned above.

Next, FIG. 2(a) shows the basic structures of the liquid cooling system, which is contained within the unit housing 114. Heat generated from heat-generation elements of the disk drives 26 (i.e., the so-called electronic parts for control, such as, a driver motor, an actuator, a LSI, etc.) can be radiated outside through a radiator 102, with which a large heat-radiation area can be obtained; therefore, it is possible to obtain cooling effect even on an element having a large amount of heat-generation, with high efficiency. Accordingly, by use of the liquid cooling system high-speed recording of the disk array apparatus is enabled.

Herein, turning back to FIG. 1, within the unit housing 114, according to the present embodiment, a box 27, aligning the disk drives 26 therein, as being heat-generation sources, by a large number thereof, is disposed in a front in the figure, on the other hand, an electric system, such as, a power source device 32 and/or a mother board (not shown in the figure), an I/O board, etc., is disposed at a back of the unit housing at the right-hand side in the figure, and a cooling system or the like, such as, the radiator 102, the fans 33, the pump 107, etc., for circulating the liquid coolant therein, at the back of the unit housing at the left-hand side in the figure. Further, according to the present embodiment, within a space, being defined between a space where the cooling system mentioned above is located and a space where the power source system of the electric power source device 32 is located, is provided a partition 112. This structure enables minimizing damage of the electric system when the cooling liquid leaks from a portion or a connecting portion of pipes 101 of the cooling system.

Also, as is apparent from FIG. 1, cooling winds blown by the fans 33, after cooling the respective disk drives 26 when passing within the box 27, pass through the radiator 102, and are discharged or ventilated into a rear direction of the unit housing 114 Since a wiring space of the rack is usually used as an air ventilation area for the entire of rack, in particular, in case when a plural number of the unit housings 114 are installed into the rack. However, depending on the structures of the rack, into which the unit housings 114 are installed, there may be a requirement for a larger space for the electric system, such as, the I/O connector, etc., on a rear-side surface thereof, and it is preferable to ventilate the air from the rear-side surface of the rack.

Further, with the present embodiment, a controller for controlling the entirety of the unit housing 114 is disposed under the jacket 118 shown in the figure, and further a sensor 120 for sensing temperature is provided on the pipe 101 connecting an exit of the jacket 118 for cooling the controller and the radiator 102. Thus, the resolution speed of the pump 107 is controlled in proportion with the temperature detected by that temperature sensor 120. Further, in more details, as the temperature sensor is adopted as a thermistor, for example, and an output of the thermistor is inputted into a pump controller portion 126 (see FIG. 2(a)) which is already provided within the pump 107, directly, so as to achieve control on the rotation speed of the motor. For this reason, the control upon the rotation speed of the pump 107 can be carried out, independently, by the pump 107 irrespective of any other controller, and with this, it is possible to make the wiring simplified, and to increase the reliability of the control.

With such the structures mentioned above, although it will be also explained later in details thereof, when the controller is provided under the jacket 118 and is in the fully operating condition, an amount of heat generation is large, and the value of temperature detected by the temperature sensor 120 is large; therefore, the pump 107 rotates at a high speed. On the other hand, under the idling condition of this controller, the amount of heat generation from the heat-generating portion is small, and the value of the temperature sensed by the temperature sensor 120 also decreases. Thus, the rotation speed of the pump 107 goes down, and also the circulating flow rate goes down. As a result, the temperature value sensed by the temperature sensor 120 increases. For this reason, the pump 107 maintains a balance at an appropriate rotation speed. In this manner, the rotation speed of the pump 107 changes (or is controlled) depending upon a load condition in the controller. In other words, when the controller does not fully operate, the pump 107 can lower its rotation speed and therefore, the lifetime of the pump 107 can be increased.

Figure 3:
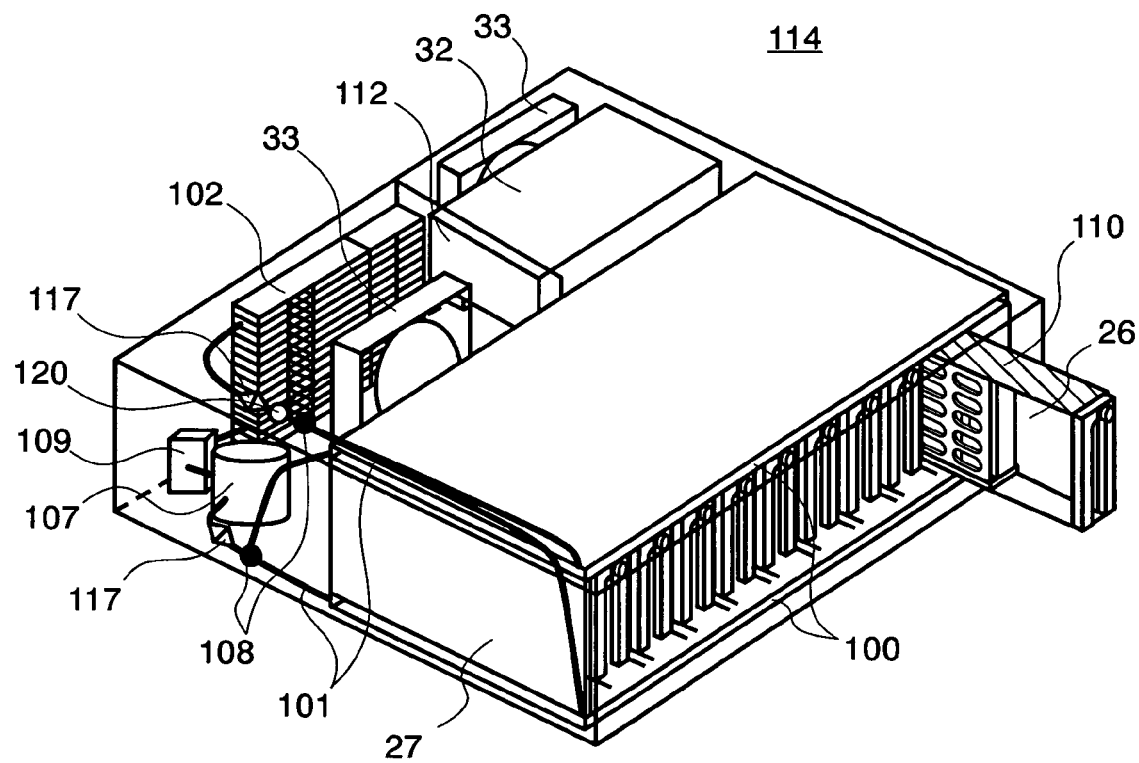
FIG. 3 is a perspective view of a unit housing, building up a disk array apparatus, according to other embodiment of the present invention.
Figure 4:
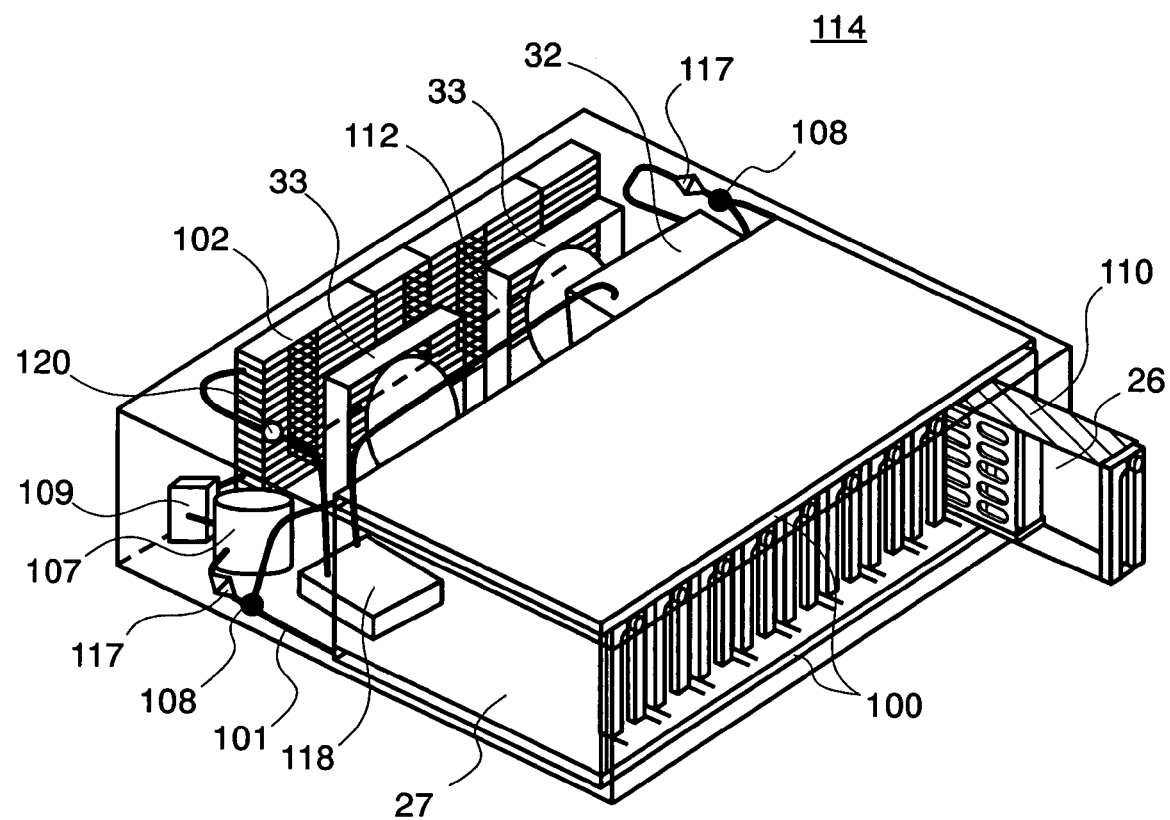
FIG. 4 is a perspective view of a unit housing, building up a disk array apparatus, according to further other embodiment of the present invention.
Figure 5:
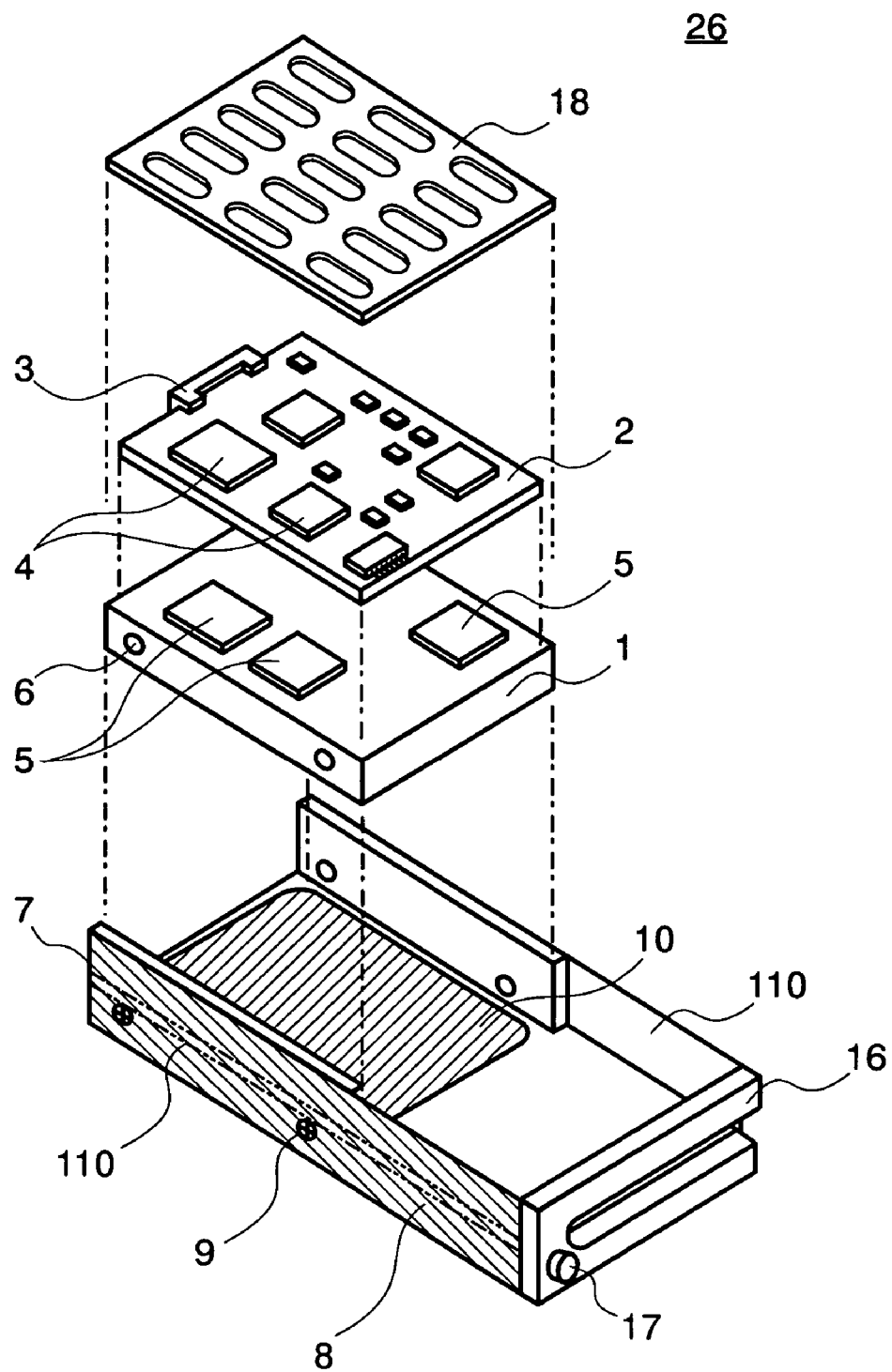
FIG. 5 is an exploded perspective view for showing the detailed structure of the disk drive, a large number of which are stored or contained within the unit housing mentioned above.

Next, FIGS. 3 and 4 show further embodiments, according to the present is invention. First of all, with the embodiment shown in FIG. 3, the liquid cooling system mentioned above comprises cold plates 100, and through those cold plates 100 is achieved cooling upon a large number of disk drives 26 within the box 27. However, those cold plate 100 are provided in a pair thereof, and they are attached on the upper and the lower surfaces of the box 27 containing the large number of disk drives 26 inside thereof, in the figure. Also, within the embodiment shown in FIG. 4, in addition to the pair of the cold plates 100 mentioned above, the cooling liquid is circulated within the power source 32 and other cooling jacket 118, other than those, at the same time, thereby obtaining the cooling function.

In those embodiments, as shown in FIGS. 3 and 4, on side walls of the canister 7 (see FIG. 5), i.e., upon an upper and a lower surfaces of the each disk drive 26 in the figure are connected members 110 for accelerating heat conduction, and further, upon an upper and a lower surfaces of the box 27, containing the large number of those disk drives 26 therein, are connected the pair of cold plates 100, thermally. Further, the canister 7, in particular, the members for building up the sidewalls thereof, are built up with a material having a high heat conductivity, preferably, with using a metal, such as, copper, aluminum, or stainless, etc. Or, in the place thereof, carbon materials having the high heat conductivity can be also considered, using carbon fibers, carbon composites, and carbon nano-tubes, etc. In this manner, with using the material having the high heat conductivity as the heat-conduction accelerating member 110 for making up the side walls of the canister 7, it is possible to transfer the heat absorbed from the disk main bodies 1 through the canister 7 to the outside, with high efficiency.

However, within the pair of cold plates 100 is enclosed the coolant, for example, water or an anti-freezing solution, etc. Also, the cold plates 100 are connected to the radiator 102 through the pipes 101. Namely, a flow passage for the cooling liquid (i.e., a cooling cycle) is formed through the pipes 101, between the cold plates 100 and the radiator 102. Further, within the embodiments shown in FIGS. 3 and 4, there is provided a branching/combining portion 108 for the pipes 101, so as to connect the pair of cold plates 100 to one (1) piece of radiator 102. Also, by means of a joint 117, it is possible to make the pipe on the box 27 side freely detachable with respect to the cooling cycle. With such the structures, it is possible to improve the manufacturability of the disk array housing as a whole, remarkably.

Also, with the structures mentioned above, heat transmitted from the disk main bodies 1 into the canister 7 (see FIG. 5) is transferred through the heat-conduction accelerating member 110, to the pair of cold plates 100, which are provided on the upper and the lower surfaces of the box 27, so as to be absorbed into the cooling liquid within those cold plates 100. Thereafter, the cooling liquid absorbing the heat therein moves into the radiator 102, to so as to enable removal of the heat therefrom (i.e., heat exchange), and thereafter the cooling liquid retains to the cold plates 100, again. Thus, it is possible to cool down the box 27 containing the plural number of canisters 7 inside thereof, as well as, the canisters 27, each installing the disk drive 26 inside thereof, with high efficiency.

Following to the above, FIG. 5 attached herewith shows the detailed structures of the disk drive 26 to be installed within an inside of the canister 7. As is apparent from the figure, within the disk main body 1 are installed the so-called heat-generating portions, such as, the magnetic disk, the drive motor, the magnetic head, the actuator, etc., not shown in the figures. Also, on an upper portion of the disk main body 1 is mounted the control-use package boards 2, which is electrically connected to the disk main body 1. Further, this control-use package board 2 administrates data transmission and control thereof between the disk main body 1 and the outside.

Thus, on this control-use package board 2 are mounted a so-called connector 3, for the purpose of conducting transmission of electric signals and supply of electricity between a large-sized board not shown in the figure herein, and further a plural number of LSIs 4. Further, those LSIs 4 also make up one of the representative heat-generation bodies, as well as, the disk main bodies 1 mentioned above. And, the heats generated from those LSIs 4 are transmitted through a heat conduction sheet 5, which is provided between the disk main body 1 and the control-use package board 2, into the disk main body 1 through the heat conduction, and thereafter, they are discharged into the outside, together with the heats from this disk main body 1, as was mentioned above.

By the way, as is shown in the figure, the disk main body 1, mentioned above, is assembled onto the canister 7 by means of screws 9, which are put on guide plates 8 for the canister 7, through a plural number of screw holes 6, which are formed on both side surfaces of the disk main body 1. Further, on this canister 7 is provided a handle 16, so that the disk drive 26 can be easily detached when conducting maintenance. Moreover, this handle 16 is built up with a so-called lock mechanism, for the purpose of increasing the reliability in operation of the disk array apparatus; in more details thereof, the disk drive 26 cannot come out from the place by only pulling this handle out. Thus, it has such structures that the disk drive 26 can only be removed while also pushing down a release button 17, which is provided neighboring thereto, when trying to remove this disk drive 26.

On the other hand, upon an upper portion of the control-use package board 2 is attached a cover 18 for the purpose of protection of the control-use package board 2. Also, the canister 7 and the disk main body 1 mentioned above are connected with, thermally, through a heat conduction grease 10, and this builds up the structures, so that the heat from the disk main body 1 and the control-use package board 2 can transfer, collectively, into the canister 7. And, as was mentioned above, since the heat-conduction accelerating members 110, mentioned above, are connected on both side walls of the canister 7, therefore the heats transferring from the disk main body 1 into the canister 7 is transmitted into the cold plates 100 through the heat-conduction accelerating members 110. In this manner, those heat-conduction accelerating members 110 are provided for the purpose of connecting between the canister 7 and the box 27, thermally, by removing the distance defined between the cold plates 100. For that purpose, it is preferable for the material of making up that heat-conduction accelerating members 110 to have a flexibility, as well as, a certain degree of heat conductivity, such as, the material applying the heat-conduction grease therein, for example. With this, it is possible to remove the unevenness in temperature, completely, with an increase of temperature on each disk drive, being generated, depending upon the contacting condition, in particular, between the disk drives and the box.

Next, explanation will be given about the operation of the disk drive mentioned above. The controller (for example, being disposed under the jacket 118 for use of cooling the controller in FIG. 1) is able to grasp the operation conditions of the disk drives 26 installed within the housing; i.e., the disk drive 26 is in any one of the conditions, "Ready", "Not Ready", or "Power OFF", through conducting communication therewith. Also, the controller transmits a command to the disk drive 26, thereby to control the operation of the disk drive 26.

On the other hand, upon receipt of the command transmitted from the controller mentioned above, each of the disk drives 26 turns the operation condition into any one of "Ready", "Not Ready", or "Power OFF". The disk drive 26 operating under the condition "Ready" can receive a command of read-out or write-in of data, which is transmitted from the controller. Thus, the disk main body 1 of the disk drive 26, operating under the condition "Ready", rotates at a high rotation speed necessary for conducting read-out or write-in of data. On the other hand, in case where the disk drive 26 is running under the operating condition of "Not Ready", the disk drive does not rotate at the high rotation speed necessary for conducting read-out or write-in of data. Further, the disk drive 26 running under the operating condition "Not Ready" will not receive the commands relating to the read-out or write-in of data, however it can receive a command of specific kind, such as, a command for shifting into the operating condition "Ready", for example. Further, in case where the disk drive 26 is under the condition of "Power OFF", the disk drive 26 cannot receive any one of the commands, which are transmitted from the controller. Also, in this time, the disk main body 1 of the disk drive 26 stops the rotation thereof, completely.

In this manner, an averaged electric power consumption of the disk drive 26 is at the maximum when it operates under the condition "Ready", and when it is operating under the condition "Not Ready", the averaged electric power consumption is less than that when it is operating under the condition "Ready". And, the averaged electric power consumption of the disk drive 26 is zero (0) under the condition of "Power OFF".

Then, also within the embodiments shown in FIGS. 3 and 4 mentioned is above, the temperature sensor 120 is provided on the pipe 101 at an inlet side of the radiator 102, in the similar manner to that shown in FIG. 1, so as to change (or control) the rotation speed of the pump 107 depending on the detection value thereof. Thus, in the embodiment shown in FIG. 3 mentioned above, when the disk drive 26 within the box 27 is fully operating for writing or the like, the pump 107 is rotated at the rated rotation speed, on the other hand, in an idling operation thereof it is rotated at a low speed. Further, in the embodiment shown in FIG. 4 mentioned above, the temperature sensor 120 changes (or controls) the rotation speed of the pump 107, depending upon the operating condition of the unit housing 114 as a whole, including the controller and the electric power source 32 therein, in addition to those mentioned above, from the structures of circulating the cooling liquid within the electric power source 32 and the other jackets, at the same time, in addition to the pair of cold plates 100. With this, in the similar manner to the embodiment mentioned above, it is possible to reduce the rotation speed of the pump, as compared to the case where it rotates at the rate rotation speed all the time, and thereby to increase the lifetime of the pump 107, greatly; i.e., improving the reliability of the cooling system.

Figure 2B:
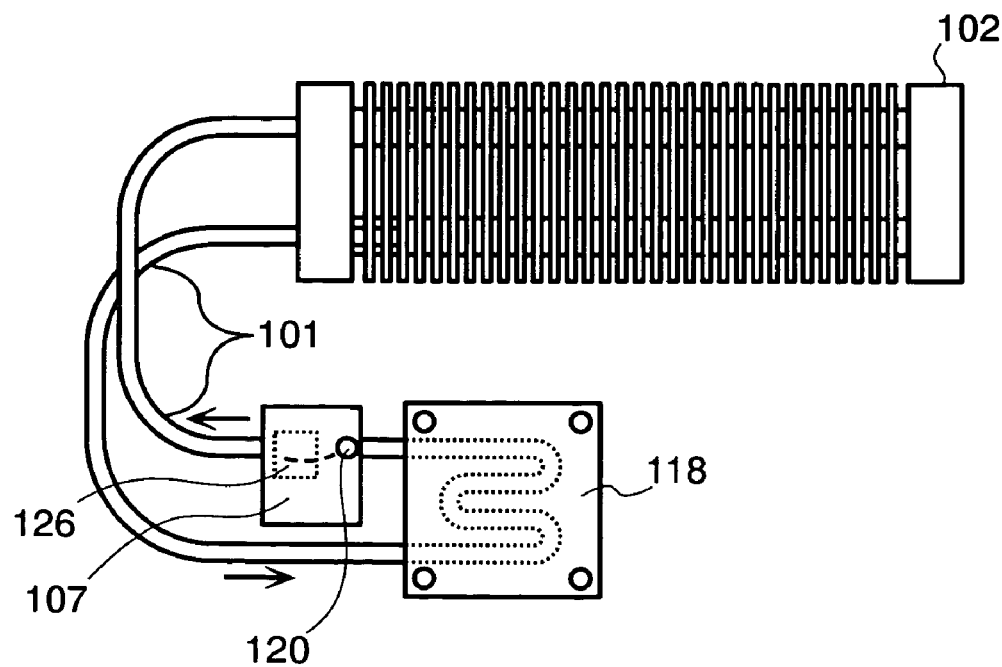

Further, FIG. 2(b) shows other structures of the liquid cooling system to be applied into the embodiments mentioned above. In such the structures of the liquid cooling system shown in this figure, but comparing to the liquid cooling system shown in FIG. 2(a) mentioned above, the pump 107 is provided on a side of the exit of the cooling jacket 118, and also the temperature sensor 120 is provided within the pump 107. With such structures of the liquid cooling system, there is no need of provision of wiring between the temperature sensor 120 and the pump 107; therefore, it is possible to simplify the work of attaching the liquid is cooling system, greatly.

Figure 6:
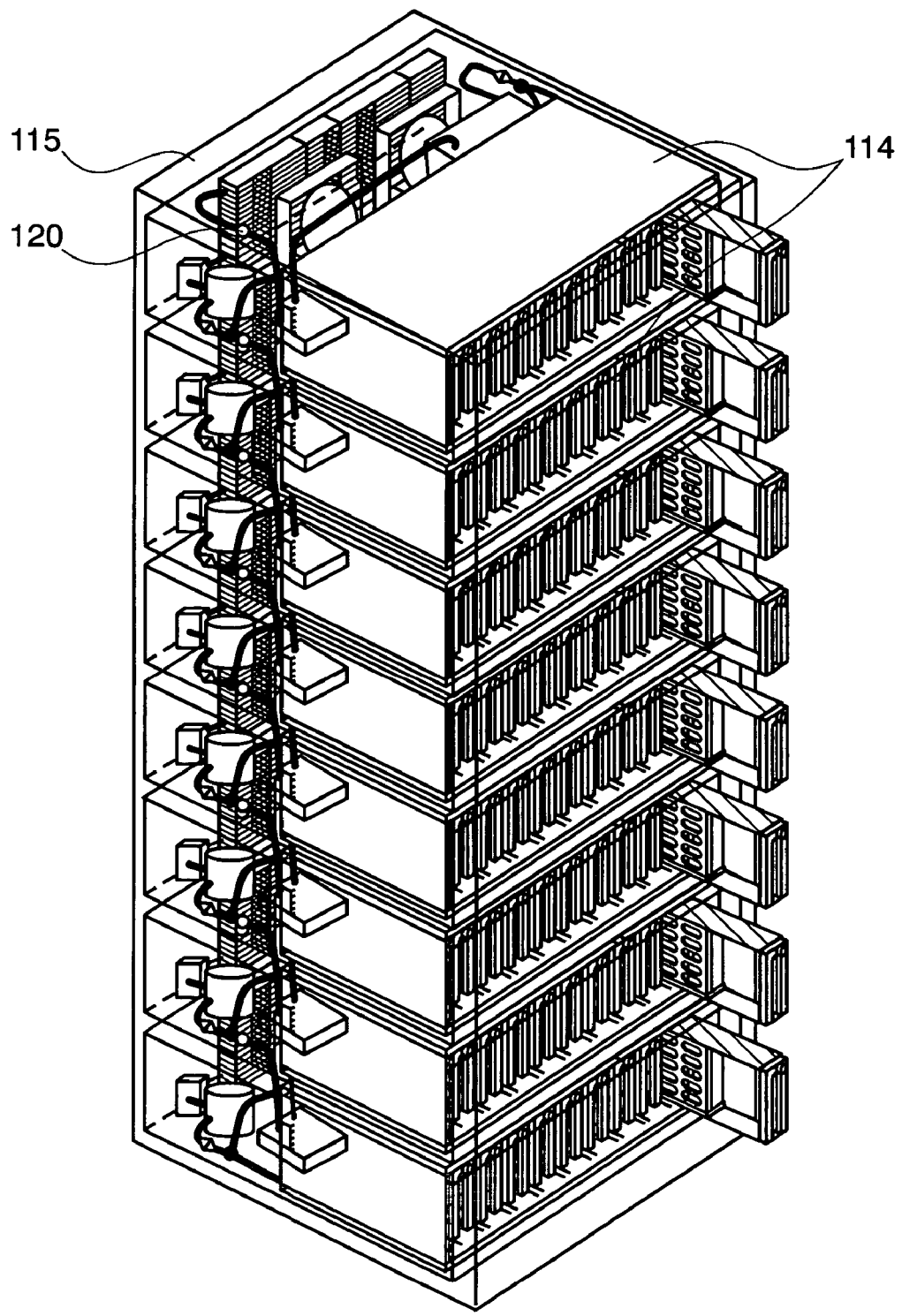
FIG. 6 is a perspective view for showing the entire structures of the disk array apparatus, according to the present invention, storing therein the disk array apparatus in a large number thereof, according to the embodiment mentioned above, into an inside of a rack.

Next, FIG. 6 shows the disk array apparatus in the condition where the unit housings 114, the detailed structures of which are explained in the above, are installed into a container housing, i.e., the so-called rack 115, by a large number (in the present example, eight (8) pieces) thereof. A space behind the rack 115 defines an area for wiring. Also, in the example in this FIG. 6, the cooling winds blown from the radiator 102 of each unit housing 114 is discharged into the rear of the unit housings 114. This is because the wiring space of the rack (i.e., the rear side of the rack) is utilized to be a discharge area for the rack as a whole, as was mentioned above, in case when the unit housings are installed into the rack 115. However, since there may be a case that the air should be discharged from the side surfaces on the rear side thereof, in particular, when much space is needed for the electric system, such as, the I/O connectors, etc., for example, on the reverse surface thereof, therefore selection may be made, appropriately, depending on the situation thereof.

As was mentioned above in details thereof, with the structures of the disk array apparatuses shown in FIGS. 1 to 6 in the above, according to the embodiments of the present invention, it is possible to obtain an improvement upon the cooling performances of the controller and each of the disk drives, while maintaining the reliability thereof, by applying the liquid cooling system therein, of using the pump changing the rotation speed depending on the electric power consumed therein, even in a case when installing the large number of disk drives at high density thereof, and further suppress the unevenness in temperature to be the minimum among the disk drives, which are installed into the housing by a large number thereof at high density; thereby achieving the disk array system able to be large in the capacity and high in the speed thereof.

However, in the explanation given in the above, though only the embodiment was mentioned, in which the temperature sensor is disposed on the pipe at the inlet side of the radiator, however, the present invention should not be restricted only to such the disposition; but, for example, a further temperature sensor may be connected on the pipe at the exit side of the pump, so as to control the rotation speed of the pump depending on the values of those two (2) sensors and the difference in temperature, and thereby enabling a finer control by means of the liquid cooling system. Also, with the present embodiment, because the cooling control is achieved, separately from the electronic circuit, such as, the controller, it is possible to obtain the cooling control with the simple structure, certainly and safely.

In summary of the above, within the disk array apparatus according to the present invention, the cooling performances come to be almost constant among the respective disk drives, which are contained within the housing at high density and large number, and therefore it is possible to overcome an unevenness in temperature that is caused due to shifting in the positions of installing the disk drives by themselves, and so on, for example, which becomes a problem with the conventional disk array apparatus. In this manner, according to the present invention, by achieving an improvement on the cooling performances of the disk drives in the disk array apparatus, greatly, it is possible to build up the cooling system having high reliability and high performances, being applicable to the disk drives having high heat-generation, which can be prospected in the future.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A disk array apparatus, comprising:
 a plural number of units, each containing at least one disk drive into an inside of a housing; and
 a rack for containing the plural number of units within an inside thereof, wherein
 said unit comprises a controller for controlling each of said at least one disk drive within said unit and an air-blow fan, as well as, a liquid cooling system having, a pump for transmitting a liquid coolant, a radiator for transmitting heat absorbed into the liquid coolant into an outside air, and pipes for connecting those,
 said liquid cooling system is connected thermally with, at least said controller for said at least one disk drive and a part of said unit adjacent said at least one disk drive for enabling cooling of said at least one disk drive, and further
 a rotation speed of said pump is controlled depending on a detection signal from a temperature sensor, which is provided in a part of said liquid cooling system, for detecting a temperature of the liquid coolant, which changes in response to electric power consumed within said controller and said at least one disk drive of said plural number of units,
 wherein the rotation speed of said pump is controlled independently of any other control of said disk array apparatus including control of said air-blow fan.

2. The disk array apparatus, as described in the claim 1, wherein the pipes of said liquid cooling system within each of said units are further provided within a power source portion of said unit.

3. The disk array apparatus, as described in the claim 1, wherein said temperature sensor within each of said units is provided in a part of the pipes, which build up said liquid cooling system.

4. The disk array apparatus, as described in the claim 2, wherein said temperature sensor within each of said units is provided in a part of the pipes, which build up said liquid cooling system.

5. The disk array apparatus, as described in the claim 1, wherein the part adjacent said at least one disk drive is a cooling jacket which is provided within each of said units, being thermally connected with the plural number of units containing said at least one disk drive and contained within said housing, and is connected to said pipes, thereby building up a part of said liquid cooling system.

6. The disk array apparatus, as described in the claim 1, wherein further a cooling jacket is provided within each of said units, for cooling said controller, and is connected to said pipes, thereby building up a part of said liquid cooling system.

7. The disk array apparatus, as described in the claim 5, wherein further a cooling jacket is provided within each of said units, for cooling said controller, and is connected to said pipes, thereby building up a part of said liquid cooling system.

8. The disk array apparatus, as described in the claim 1, wherein said temperature sensor is provided in vicinity of an inlet of said radiator within each of said units.

9. The disk array apparatus, as described in the claim 5, wherein said temperature sensor is provided in vicinity of an inlet of said radiator within each of said units.

10. The disk array apparatus, as described in the claim 1, wherein the detection signal from said temperature sensor within each of said units is directly inputted into a controller portion of said pump building up said liquid cooling system within each of said units.

11. The disk array apparatus, as described in the claim 5, wherein the detection signal from said temperature sensor within each of said units is directly inputted into a controller portion of said pump building up said liquid cooling system within each of said units.

12. The disk array apparatus, as described in the claim 1, wherein a partition is provided within an inside of each of said units, thereby separating said liquid cooling system in spaces thereof.

13. The disk array apparatus, as described in the claim 5, wherein a partition is provided within an inside of each of said units, thereby separating said liquid cooling system in spaces thereof.

14. A liquid cooling apparatus for use in a disk array apparatus, containing a plural number of units, each containing at least one disk drive into an inside of a housing, within a rack, comprising:

an air-blow fan;

a pump for transmitting a liquid coolant;

a radiator for transmitting heat absorbed into the liquid coolant into an outside air;

a part adjacent said at least one disk drive for enabling cooling thereof;

pipes for connection of at least said pump, said radiator and said part; and a temperature sensor for detecting temperature of the liquid coolant;

wherein said temperature sensor is disposed at a position so as to detect the temperature of the liquid coolant, which changes in response to electric power consumed within said at least one disk drive of said plural number of units;

wherein a rotation speed of said pump is controlled depending upon a detection signal from said temperature sensor; and wherein the rotation speed of said pump is controlled independently of and other control of said disk array apparatus including control of said air-blow fan.

15. The liquid cooling apparatus, as described in the claim 14, wherein said part includes a cooling jacket, which is thermally connected with said at least one disk drive of the plural number of units contained within said housing, wherein said cooling jacket is connected to said pipes.

* * * * *